J. ANDERSON.
COVER LOCKING DEVICE.
APPLICATION FILED JAN. 18, 1915.

1,170,951.

Patented Feb. 8, 1916.

WITNESSES:
S. L. Armstrong
W. R. Coley

INVENTOR
John Anderson
BY
Wiley G. Carr
ATTORNEY

THE COLUMBIA PLANOGRAPH CO., WASHINGTON, D. C.

UNITED STATES PATENT OFFICE.

JOHN ANDERSON, OF MOUNT VERNON, MAINE, ASSIGNOR TO WESTINGHOUSE ELECTRIC & MANUFACTURING COMPANY, A CORPORATION OF PENNSYLVANIA.

COVER-LOCKING DEVICE.

1,170,951.  Specification of Letters Patent.  Patented Feb. 8, 1916.

Original application filed June 2, 1905, Serial No. 263,493. Divided and this application filed January 18, 1915. Serial No. 2,940.

*To all whom it may concern:*

Be it known that I, JOHN ANDERSON, a citizen of the United States, and a resident of Mount Vernon, in the county of Kennebec and State of Maine, have invented a new and useful Improvement in Cover-Locking Devices, of which the following is a specification, this application being a division of application Serial No. 263,493, filed June 2, 1905.

My invention relates to electrical machines and particularly to electric motors that are utilized for propelling vehicles.

The object of my invention is to provide a plate for covering the opening in a motor frame adjacent to the commutator and simple and efficient means for detachably locking the cover plate in position.

It is usual to provide the frames of motors that are employed for operating railway vehicles with openings adjacent to the commutators in order that access may be had to the brushes and brush holders for inspection and repairs. For the purpose of protecting the commutators, so far as possible, from injury by objects encountered by the motor during operation, it is desirable to provide cover plates for the openings above referred to, which shall be securely held in position and which may be readily removed in order to permit of access to the commutator parts.

I have devised a means which meets all the requirements of satisfactory service and such means are illustrated in the accompanying drawings in which—

Figure 1:
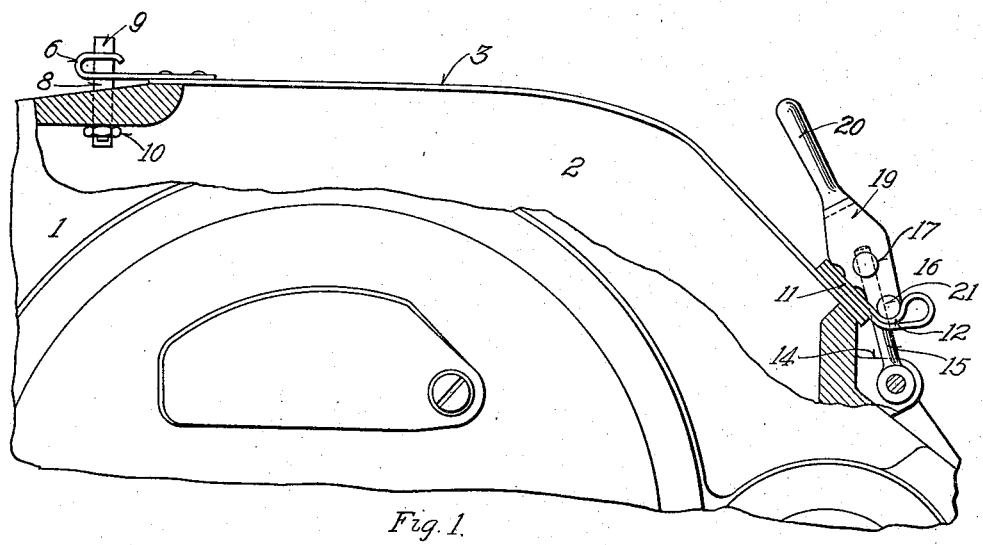
Figure 2:
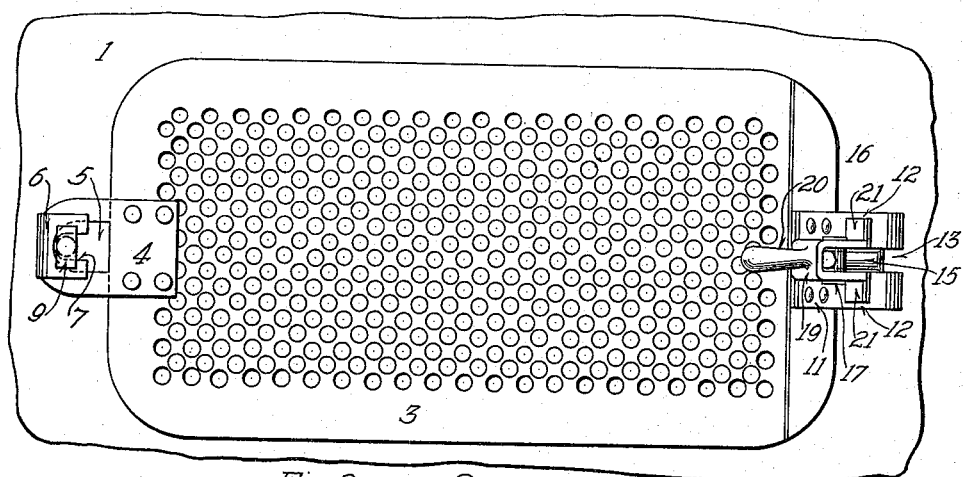
Figure 3:
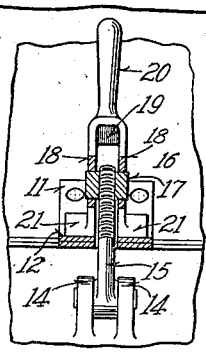

Figure 1 is an end elevation of a railway motor equipped with my invention, parts being broken away and shown in section. Fig. 2 is a plan view of the parts shown in Fig. 1 and Fig. 3 is a detail, sectional view of the locking device shown in Figs. 1 and 2.

The commutator end of the field magnet frame 1, of the electric motor here shown, is provided with an opening 2, through which access may be had to the commutator (not shown), when desired and this opening is provided with a cover plate 3, which may be a plate of imperforate sheet metal. The edge of the plate 3 opposite that provided with the hinge device 6 is provided with an ear 11 that is shown as formed of a doubled length of sheet metal and as riveted to the plate 3. The outer end of the ear is bent to form a recess 12 and is also provided with a notch or slot 13.

The motor frame is provided with a pair of lugs or ears 14 adjacent to one end of the opening 2 and between these ears is pivoted one member 15 of a toggle-joint lever 16. The free end of the member 15 is provided with a screw thread by means of which it makes adjustable engagement with a pin 17. The ends of the pin 17 are pivotally mounted in the arms 18 of the bifurcated member 19 of the toggle-joint lever 16, the outer end of the same member being provided with an operating handle 20 and its inner end being provided with two lateral, cylindrical projections 21, which engage the recesses 12 in the ear 11 when the device is in locking position, as indicated in the drawings.

By reason of the yielding, resilient character of the ears 4 and 11 and the adjustability of the fastening devices, the plate may be securely locked in position so that it can have no movement during the operation of the motor and the plate may be readily released and removed by moving the handle 20 outwardly to free the ear 11.

While I have shown a specific device for accomplishing the desired result, I desire it to be understood that the form, dimensions and relative location of parts may be varied within considerable limits without departing from my invention, and that the invention may be applied to machines or apparatus that differ from what is here shown and described.

I claim as my invention:

1. The combination with a casing having an opening and a cover therefor, of a resilient extension projecting beyond said cover, and a locking toggle for coöperating with said extension and comprising an operating lever and means associated with said lever intermediate its ends for associating said lever with said casing.

2. The combination with a casing provided with an opening and a removable cover therefor, of a resilient slotted member associated with said cover and having a recess therein, and a locking toggle comprising a bifurcated operating lever having lateral end projections adapted to be seated in said recess, a pin disposed between the arms of said bifurcated lever intermediate their ends and a member connecting said pin with said casing and adapted to be moved into and out of the slot in said resilient member.

3. The combination with a casing and a removable cover therefor, of locking means for fastening said cover to said casing and comprising an operating lever, means associated with said lever intermediate its ends for connecting said lever to said casing, and means associated with and constituting a part of said locking means for introducing an element of resilience therein.

In testimony whereof, I have hereunto subscribed my name this twelfth day of January, 1915.

JOHN ANDERSON.

Witnesses:
ELLSWORTH E. PEACOCK,
MAUDE S. MORSE.

Copies of this patent may be obtained for five cents each, by addressing the "Commissioner of Patents, Washington, D. C."